H. C. HARRIS.
COMBINATION SAW SET AND SHARPENER.
APPLICATION FILED MAY 8, 1916.
1,229,450.
Patented June 12, 1917.
2 SHEETS—SHEET 2.
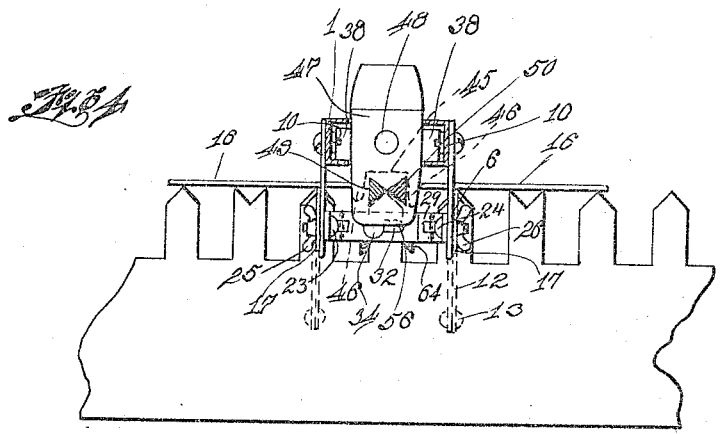
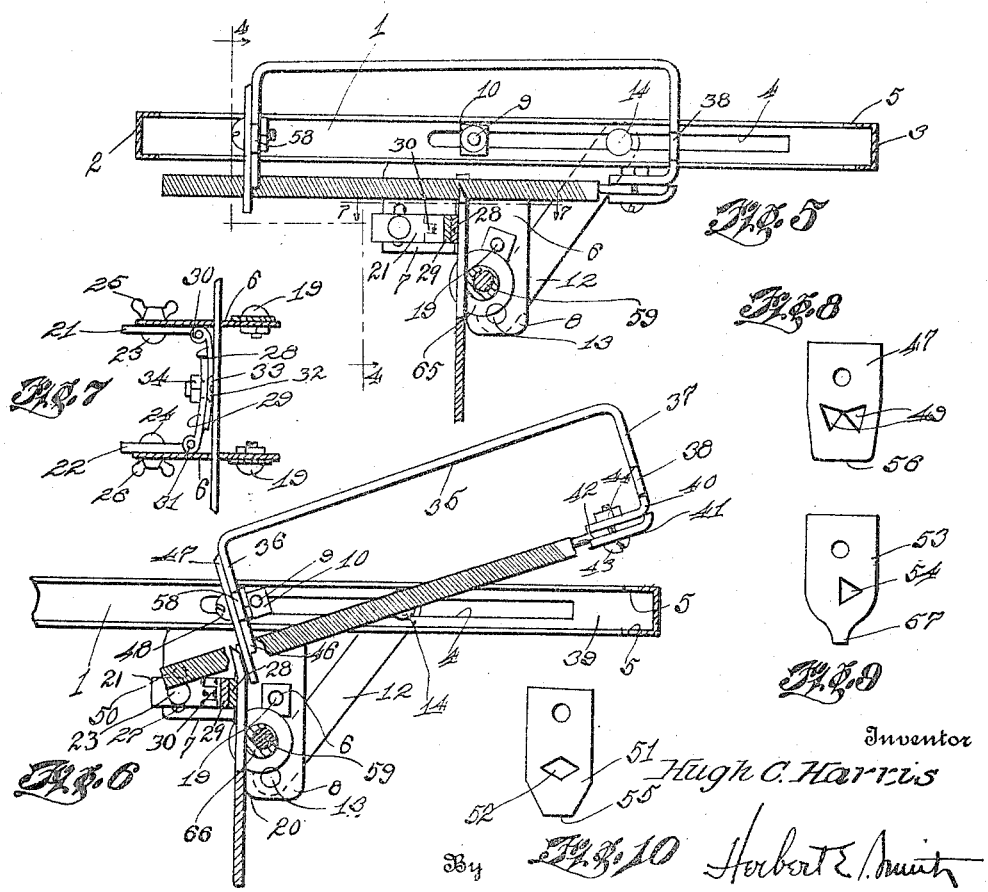
Inventor
Hugh C. Harris
By Herbert E. Smith
Attorney

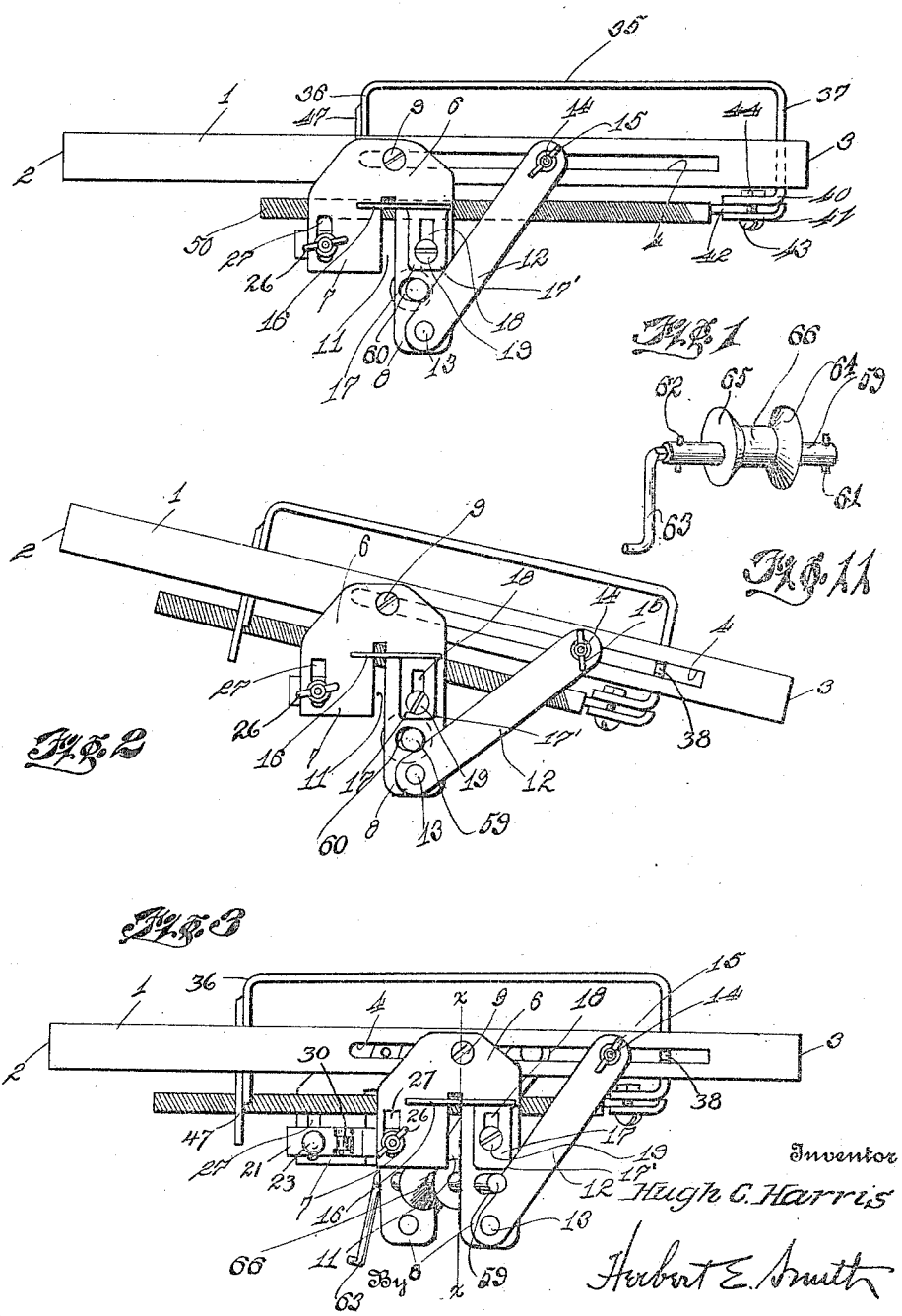

UNITED STATES PATENT OFFICE.

HUGH C. HARRIS, OF COEUR D'ALENE, IDAHO.

COMBINATION SAW SET AND SHARPENER.

1,229,450.

Specification of Letters Patent.

Patented June 12, 1917.

Application filed May 8, 1916. Serial No. 96,069.

*To all whom it may concern:*

Be it known that I, HUGH C. HARRIS, a citizen of the United States, residing at Coeur d'Alene, in the county of Kootenai and State of Idaho, have invented certain new and useful Improvements in Combination Saw Sets and Sharpeners, of which the following is a specification.

The object of this invention is to provide a combined saw set and sharpener.

This invention includes a file holder which is linearly reciprocable in a frame, together with means mounted on the frame and adapted to rest upon the saw blade, the said means being adjustable so as to permit the frame to be disposed at right angles to the plane of the saw blade, or at an oblique angle with respect to the saw blade, vertically speaking, or at an oblique angle with respect to the saw blade, horizontally speaking.

My invention also includes an improved form of abutment against which the saw tooth, or that portion of the saw adjacent the tooth, will be thrust during the sharpening operation, this abutment performing the dual function of an abutment for a sharpener, and an abutment for a saw setter.

A further novel feature of my invention, considering the invention as regards the setting feature, is the provision of means whereby the file holder may be tilted or adjusted from its normal linear travel to an inclined position with respect to the frame, such as will permit of the operator exerting manual pressure on the saw holder to abut a portion of the latter against the tooth to be set and properly displace such tooth to the desired set angle. In this connection, a further feature of the invention consists in the provision of an improved file gage which performs the dual function of holding the file or files in the proper relation with respect to the saw tooth, to perform the sharpening operation, such gage also being fitted or provided with means for abutment against the teeth of the saw to set the same either to cut the required kerf, or at the desired angle irrespective of the width of kerf.

A further feature of my invention consists in the provision of a plurality of file gages which are selectively attachable to the file holder in such a manner as to hold the file or files in the proper positions for sharpening teeth of various types of saws.

Other features and objects of the invention will be more fully described in connection with the accompanying drawings and will be more particularly pointed out in and by the appended claims.

In the drawings:—

Figure 1 is a view in side elevation of my device adjusted for sharpening the drag tooth of a cross cut saw.

Fig. 2 shows the device tilted for sharpening certain types of hand saws, it being understood that a tilt at a greater inclination would be required for sharpening the cutting teeth of a cross cut saw.

Fig. 3 is a view in elevation of the device adjusted horizontally, at an oblique angle to the plane of the saw, for sharpening crosscut saws.

Fig. 4 is a sectional view on line 4—4 of Fig. 5, with a gage file holder of the type used for sharpening the cutting teeth of a cross cut saw.

Fig. 5 is a longitudinal vertical sectional view of the device as shown in Fig. 4.

Fig. 6 illustrates an adjustment of the device which would be used in setting the teeth of a cross cut or other saw.

Fig. 7 is a sectional view on line 7—7 of Fig. 5.

Fig. 8 is a detail view in elevation of a gage plate for the cutting teeth of cross cut saws.

Fig. 9 is a view in elevation of a gage plate which would be used for different types of hand saws.

Fig. 10 is a view in elevation of a gage plate for use in sharpening a drag tooth of a cross cut saw.

Fig. 11 is a detail of the cam and lever for locking the saw set to the saw during the filing of a tooth.

Like characters of reference designate similar parts throughout the different figures of the drawings.

As illustrated, my invention includes an elongated rectangular frame having relatively long sides 1 and relatively short ends 2 and 3. The sides 1 are slotted as indicated at 4 to function as guideways for adjustments which will hereinafter more fully appear. I prefer to make the frame 1 of channel cross section, as clearly indicated in Figs. 4 and 5, and I utilize the resulting grooves as guide-ways in which the file holder is relatively loosely held to a linear path of travel, and from which it may be adjusted to any desired inclination with respect to the frame. Near the rear end of the frame I provide notches 5 which act as release ways when the file holder is tilted to the position shown in Fig. 6.

I will next describe the improved supporting and holding gage means with which my invention is provided.

My improved holding gage means is preferably in the form of gage jaws 6, the bifurcated portions being indicated at 7 and 8, one being of greater length than the other. As both gage holding jaws are identical in form and operation, only one need be described in detail. Each gage holding jaw is mounted upon one side of the frame and I preferably pivotally mount said holding jaws in such a manner that they are not only adjustable about their pivots, but also in such a manner that their pivots themselves are adjustable lengthwise of the frame. As illustrated, the pivots 9 extend through the slots 4 and are suitably anchored by any desired means such as nuts 10. Between the bifurcated portions is formed a way or slot 11 into which the tooth edge of the saw is projected by imposing the machine upon the saw. The holding jaw gages are preferably locked in adjusted relation with respect to the frame of the machine in addition to the pivots 9, by means which may comprise pivoted links 12, pivoted to the longer bifurcated portions 8, at 13, and connected with the frame by adjustable pivot bolts 14, which projects through slots 4, and which may be provided with winged nuts 15 for tightening links 12 in engagement with the frame.

Attention is directed to the fact that the holding gages on opposite sides of the frame are independently adjustable in such a manner that the frame may not only be tilted from a horizontal position to an oblique position with respect to the saw blade, as shown in Fig. 2, but also in a horizontal position at right angles to the saw blade, horizontally, and transversely disposed at an oblique angle to the blade, as shown in Fig. 3. The primary function of the holding gages is to retain the machine in the desired position upon the saw, as just described.

I will next describe the supporting gage means for supporting the machine or saw set upon the saw at selected elevations irrespective of the adjustment of the frame with respect to the saw.

My improved supporting gage means is preferably mounted upon the holding gages and may consist of plates 16, one attached to each holding gage, and projecting laterally therefrom as shown in Fig. 4. Each supporting gage is provided with a depending lug 17 which is shown slotted, at 18, and through which projects an adjusting screw 19° for locking the supporting gage in the desired position upon the holding gage. Now it will be seen by reference to Fig. 4, that irrespective of the location of the drag teeth, the supporting gages will be of such length that they will always engage at least two cutting teeth, on opposite sides of the tooth which is being sharpened, and this will be true irrespective as to whether or not the tooth sharpened is a drag tooth or a cutting tooth. In the particular utility shown in Fig. 4, the device is adjusted for sharpening one of the cutting teeth and the supporting gages 16 rest upon the cutting teeth at opposite sides of the tooth being sharpened. However, even though the device were being used to sharpen one of the drag teeth, then the supporting gages 16 would also rest upon adjacent and laterally disposed cutting teeth, and if desired, they would be slightly differently adjusted in order to dispose the files in proper relation to the drag tooth to be sharpened, such tooth being usually at a minutely lower elevation than the cutting teeth.

I have now described my improved holding means for engaging opposite faces of the blades of the saw, to hold the machine thereon, and supporting gage means for engaging the ends of the teeth of the saw for supporting the machine at the desired elevation, and I will now describe the abutment means for steadying the machine upon the saw, it being understood that there would be too much lost motion if the saw were loosely disposed in the way or bifurcation indicated at 11.

Referring in detail to my improved adjustable abutment, reference will be had more particularly to Figs. 5, 6 and 7.

It will be understood that while each machine is adapted for operation upon saw blades of different thicknesses, still the variation is so slight, and furthermore, the machine is intended to be held by the hand of the operator in such a way that the lower front corners 20 will fulcrum against the side of the saw, thereby tending to tilt the machine to the right of Fig. 6 and bring the abutment into firm engagement with the opposite face of the saw blade, closely adjacent the teeth thereof. I therefore do not find it necessary to provide for lateral adjustment of my abutment to accommodate teeth of different set. With the larger saws, of the cross cut type, the length of the tooth displaced, is of considerably greater depth than in a hand saw, for instance, and therefore, I would lower my abutment for setting and filing larger saws such as a cross cut saw, and I would elevate the abutment in operating upon hand saws. Of course it will be understood that the adjustment of the abutment, and the supporting gage plates, would be coördinated and harmonized in accordance with the work performed, as it will be understood that when the supporting gages are adjusted, the relation of the files with respect to the saw teeth would be altered.

Now referring to Fig. 7, my abutment includes adjustable end portions 21 and 22 each of which is adjustably connected with one of the shorter legs 7 of the holding jaws by means of adjusting screws 23 and 24, winged nuts 25 and 26 being provided for locking the adjusting means in position. The shorter legs 7 are vertically slotted, as indicated at 27, to provide for vertical adjustment with respect to the holding gages. To each end adjusting strip is hinged an abutment strip, said abutment strips being indicated at 28 and 29, the hinged connections being designated at 30 and 31. While the straight lateral distance between the holding jaws always remains constant, it is necessary to provide for lengthwise extensibility of the abutment by reason of the fact that the jaws are adjustable as shown in Fig. 3, for an oblique transverse mounting of the frame upon a saw. Therefore, I preferably slot the abutment strips 28 and 29, as indicated at 32, and I provide a screw and bolt, 33 and 34, for holding the abutment strips in selected lengthwise positions. In the position shown in Fig. 7, they would occupy contracted adjustment but in the position shown in Fig. 3, they would occupy a lengthened adjustment.

I will next describe my improved file holder with reference more particularly to Figs. 1 and 6.

As illustrated, my file holder comprises an elongated U-shaped frame having a hand grip bight 35 and depending forwardly and rearwardly disposed limbs 36 and 37. The rear limb 37 is provided with lugs 38 which are adapted to be inserted and withdrawn through the releasing notches 5 in accordance with the position which the holder is caused to assume. When the lugs 38 are disposed within the channel guideways, 39, of the frame, they act in conjunction, with similarly constructed and disposed, lugs 58 carried by the forward limb 36, to relatively loosely retain the file holder to a linear path of travel to and fro longitudinally in the frame.

A file clamp is mounted upon the rear limb 37 and I preferably bend the terminal end of the latter, as indicated at 40, to provide a flat clamping face, and a separate clamping plate 41 is provided, between which the shank 42 of the file or files may be held in clamped relation by a bolt and nut 43 and 44. There is sufficient area of surface to permit of either one or two shanks being interposed in clamped relation, as shown in Fig. 6, and in either event, a firm grip will be held upon the file.

Next referring to the forward limb 36, it will be seen by reference to Fig. 4, that the terminal end is forked, the bight 45 serving as an automatic gage for holding the files gaged, which will presently be described. The fork portions 46, serve to support and reinforce the file gages when the device is used for setting teeth, as will presently appear. Upon the front face of the file holder, namely the front face of limb 36, is disposed a file gage plate 47 which may be secured by a single screw 48. The file gage plate 47 is provided with apertures 49 through which the files 50 project in such a manner that the files will be held in proper relation with respect to each other, and with respect to the tooth to be sharpened, so that when they are drawn across the tooth the metal of the tooth will be uniformly beveled, at the right convergence. In the adjustment shown in Fig. 3, I have illustrated a plate 47 for sharpening a cutting tooth of a cross cut saw. In Fig. 10, I have shown a plate 51, adapted to be applied to the holder, for sharpening a drag tooth, of a cross cut saw, the opening through which the files project being indicated at 52. The contour of said opening 52, when compared with one of the drag teeth in Fig. 4, will make the adaptation clear, without the necessity of separately showing the teeth in every view. In Fig. 9 I have shown a gage plate 53 for use in various types of hand saws, the file holding aperture being indicated at 54. In Fig. 8, I have detailed a gage plate as shown in Fig. 4.

It is a distinctly novel feature of my invention to provide a file holding gage plate adapted to perform the function of holding the files and also perform the function of engaging the teeth to set the same. Therefore on those file holding gages for use in connection with saws of the larger type I provide lower setting terminals, as indicated at 55 and 56, which are relatively broad. However, in the form of file gage shown in Fig. 9, for the smaller types of saws, the setting terminal 57 is relatively reduced so as to enable this terminal to engage a single tooth of a relatively very fine saw.

The operation of sharpening a saw will now be clear from the foregoing, the lugs 38 and 58 being slidable in the channels 39 to retain the file holder in a linear path of travel irrespective as to the position of adjustment of the frame.

I will now describe the operation of setting the teeth of a saw, with reference more particularly to Fig. 6.

It will be seen that the file holder has been removed as regards its engagement with the lugs 38 with the frame, so that the holder may be tilted to the desired angle. The setting terminal of the gage plate 47, is shown in engagement with the tooth of the saw and it will now be seen that the lugs 58 engage the nuts 10, of the pivots 9, so that when stress is applied to the rear end of the file holder, the tooth will be displaced corresponding to the set desired by the operator. In Fig. 6, I have clearly shown the abutment adjusted so that the tooth will be set at a relatively short depth but it will be seen that by adjustment of the supporting gages, and also by further adjustment of the abutment, a deeper set may be obtained. At this point I wish to call attention to the double function of the pivots 9, for not only connecting the holding gages with the frame, but in also functioning as fulcrum pivots for the holder when the latter is utilized in setting a tooth.

In this specific construction shown, I dispose the openings for the pivots 9, in the holders 6, so that the centers of the openings will lie in lines $x$—$x$ coincident with the front edges of jaws 8, as shown in Fig. 3. Therefore when the device is set to sharpen the cutting teeth of a cross cut saw, for instance, at an angle which would be greater than that shown in Fig. 2, and then subsequently return to a position shown in Fig. 1, for sharpening the drag teeth, then links 12 will abut against the corners 17' and thus subsequent adjustment for the drag teeth will automatically be determined. The pivots 9 will be fixed pivots, because they will not be loosened, and it is important that they are fixed pivots in any adjustment irrespective of their capacity for adjustment longitudinally of their slots 4. Because of this concise location of the pivots 9, no readjustment is required for sharpening the drag teeth, other than moving the pivots 14 toward the pivots 9, because I do not elevate the frame and file when I adjust the machine toward the horizontal. If I had the pivots 9 disposed at the left of slot 11, with respect to Fig. 2, I would then elevate the frame and file, when adjusting from an inclined to a horizontal position. I would then also have to change the adjustment of supporting gages 16, which I do not have to do in most cases. However, I do not wish to be limited to the specific arrangement of pivot holes in the holder 6, and I shall set forth the specific disposition to show certain advantages thereof.

In order to accurately locate the file with respect to a tooth and to maintain it in that relation it is frequently necessary to make use of the locking means indicated at 66 which consists of a cam wheel mounted upon a shaft 59 with the wheel 66 off center, this mounting being fixedly made with the shaft 59. The shaft 59 is supported in slotted openings 60 on the depending body 8 and is provided near its ends with keepers 61 and 62 to prevent the shaft sliding through the slot and displacing the cam 66 from its true relation on the frame. Upon one end of the shaft 59 is a lever 63 which is used for rotating the cam and engaging the face of it against the tooth of the saw. On either end of the cam are cone members 64 and 65 which engage the edge of the tooth on either side thereof and which serve to prevent shifting or displacement of the gage during the operation of filing the tooth so engaged. As the shaft 59 is mounted in the slot 60 the frame may be shifted and the angle of the carriage regulated to meet the purposes of that particular saw, but would maintain the cam in its true working relation with respect to the file. In the case of a hand saw the edges of 64 and 65 engage the side of the saw locking it securely to the filing frame to avoid displacement.

With the foregoing description in mind, it is believed that anyone skilled in the operation of sharpening and setting saws of different types will not only understand the advantages but also the utility of my invention, and while I have herein shown and described one specific form of my invention I do not wish to be limited thereto except for such limitations as the claims may import.

I claim:—

1. In a saw sharpener, a frame, a file holder reciprocable in said frame, holding gage jaws adjustably pivoted to said frame and adapted to straddle the saw blade, and supporting gages adjustable on said gage jaws for engagement with the ends of the saw teeth for supporting the frame at the desired elevation, substantially as described.

2. In a saw sharpener, a longitudinally slotted frame, gage jaws for straddling the saw blade, devices connecting said gage jaws to the frame for independent longitudinal adjustment of the jaws along said frame or angular adjustment of the jaws with respect to said frame, and a file carrier reciprocable in said frame, substantially as described.

3. In a saw sharpener, a longitudinally slotted frame, gage jaws for straddling the saw blade, devices connecting said gage jaws to said frame for independent longitudinal adjustment along said frame or angular adjustment with respect to said frame, a file carrier reciprocable in said frame, and an extensible saw abutment adjustably mounted on said gage jaws, substantially as described.

4. In a saw sharpener, a longitudinally slotted frame, gage jaws for straddling the saw blade, devices connecting said gage jaws to the frame for independent longitudinal adjustment along the frame or angular adjustment of said jaws with respect to the frame, an abutment for the saw comprising end portions adjustably mounted on said jaws, each end portion having an abutment portion hinged thereto, and means slidably connecting said abutment portion for extensibility of the latter when said gage jaws are independently adjusted out of line with each other along said frame, substantially as described.

5. In a saw sharpener, a frame, file holding means movable on said frame, jaws for straddling a saw to hold said frame in selected position with respect to said saw, and an abutment extending between said jaws for supporting that portion of the saw to be filed, substantially as described.

6. In a combined saw sharpener and saw set, a frame, a file holder reciprocable in said frame and provided with a device for holding a file and setting a tooth, an abutment for supporting the tooth to be set, and fulcrum abutments on said frame for fulcruming said holder when said device is applied to a tooth to set the latter, substantially as described.

7. In a combined saw sharpener and saw set, a framework adapted to be mounted upon a saw to be set, a file holder reciprocable in said frame and provided with a device having an upper file holding portion and a lower tooth setting portion, an abutment for supporting the tooth to be set, and fulcrum abutments on said frame for fulcruming said holder when said device is applied to a tooth to set the latter, substantially as described.

8. In a saw sharpener, a frame, a file holder reciprocable in said frame, saw gage holders pivoted to said frame and having saw slots for insertion therein of a saw and provided with link abutments, links pivoted to said holders, and pivoted for sliding adjustment to said frame to hold the latter horizontal or in a tilted position with respect to the plane of the saw, the points of pivotal mounting of said holders with said frame being so disposed with respect to said slots that the files will be in proper position with said links to engage said abutments in adjustment from a tilted to a horizontal position, substantially as described.

In testimony whereof I affix my signature.

HUGH C. HARRIS.

Witnesses:
MELVIN L. PETERSEN,
H. E. SMITH.

Copies of this patent may be obtained for five cents each, by addressing the "Commissioner of Patents, Washington, D. C."